(12) United States Patent
Audet

(10) Patent No.: US 9,072,409 B2
(45) Date of Patent: Jul. 7, 2015

(54) TONGS SEPARABLE INTO TWO SERVING IMPLEMENTS OR THE LIKE

(71) Applicant: Steven Audet, Quebec (CA)

(72) Inventor: Steven Audet, Quebec (CA)

( * ) Notice: Subject to any disclaimer, the term of this patent is extended or adjusted under 35 U.S.C. 154(b) by 0 days.

(21) Appl. No.: 14/288,769

(22) Filed: May 28, 2014

(65) Prior Publication Data

US 2014/0375071 A1  Dec. 25, 2014

Related U.S. Application Data

(60) Provisional application No. 61/830,439, filed on Jun. 3, 2013.

(51) Int. Cl.
| | | |
|---|---|---|
| *B25B 7/00* | (2006.01) | |
| *B25B 9/00* | (2006.01) | |
| *A47J 43/28* | (2006.01) | |
| *A47G 21/10* | (2006.01) | |

(52) U.S. Cl.
CPC ............... *A47J 43/283* (2013.01); *A47G 21/10* (2013.01)

(58) Field of Classification Search
CPC ......... B65G 7/12; B25B 9/02; B25J 15/0009; A47J 43/283; A47G 21/10
USPC ............................................ 294/16, 99.2, 106
See application file for complete search history.

(56) References Cited

U.S. PATENT DOCUMENTS

| | | | | |
|---|---|---|---|---|
| 4,196,514 | A * | 4/1980 | Merriman | 30/28 |
| 5,052,416 | A * | 10/1991 | Rommerdale | 132/75.5 |
| 5,893,596 | A * | 4/1999 | Martin et al. | 294/118 |
| 7,531,197 | B2 * | 5/2009 | Jones | 426/104 |
| 2002/0117869 | A1* | 8/2002 | Wang et al. | 294/16 |
| 2012/0011727 | A1* | 1/2012 | Yang | 30/150 |

* cited by examiner

*Primary Examiner* — Stephen Vu
(74) *Attorney, Agent, or Firm* — Gerard F. Dunne; Law Offices of Gerard F. Dunne, PC

(57) ABSTRACT

Two elongated serving implements such as a slotted spoon and un-slotted spoon can easily be connected together by respective inter-fitting portions including respective cam surfaces that securely hold the utensils together and in a resiliently spaced position, but may be separated easily.

3 Claims, 3 Drawing Sheets

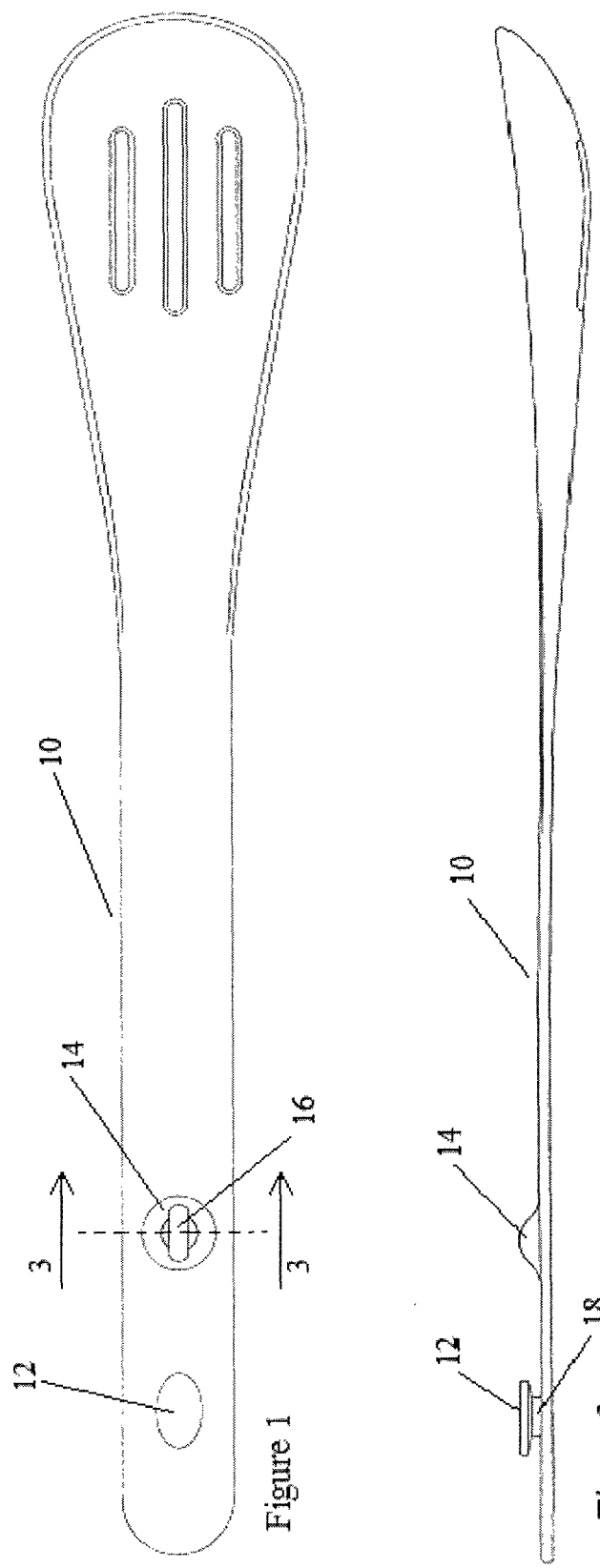

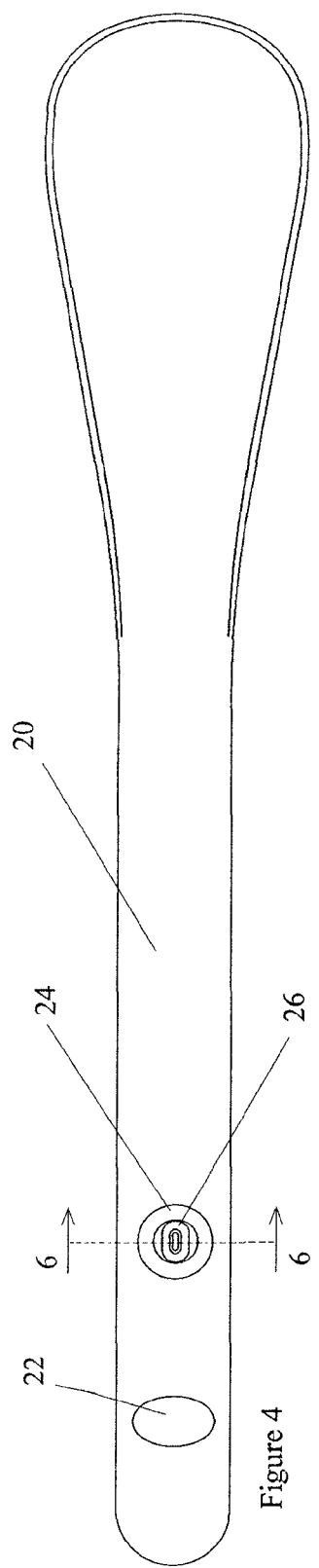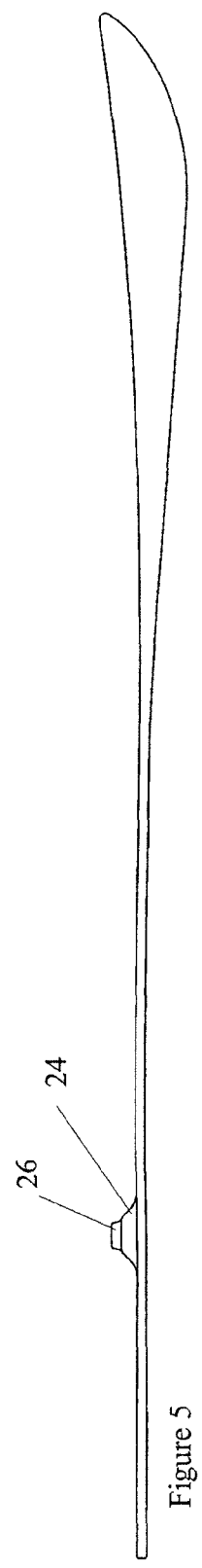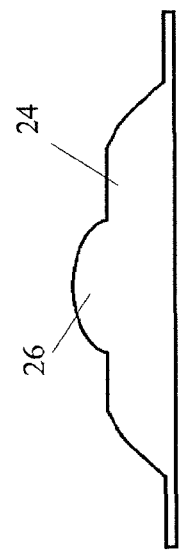

TONGS SEPARABLE INTO TWO SERVING IMPLEMENTS OR THE LIKE

CROSS REFERENCE TO RELATED APPLICATION

This application is based on provisional application Ser. No. 61/830,439 filed Jun. 3, 2013.

FIELD OF THE INVENTION

The present invention relates to a food utensil such as salad tongs that may be separable so as to be converted easily into two serving implements; and easily reattached for food handling.

BACKGROUND OF THE INVENTION

Many styles of food handling utensils are known that may serve as tongs and yet be separable to serve as individual serving implements. U.S. Pat. No. 5,054,835, for example, describes a food handling implement which in one mode of use consists of a pair of separate elements to be used as salad servers, and can be connected together by a separate retention cap. This device is somewhat cumbersome to assemble, and requires a separate retaining cap that can be misplaced.

Other devices, such as exemplified in U.S. Pat. No. 3,596,965 and German Gebrauchsmuster DE 297 16918 have separable utensils interconnected at the end portions to form tongs; or have end portions adapted to interconnect in an interlocking system such as described in U.S. Pat. No. 2,994,553. These products are also somewhat cumbersome to assemble and are not firmly held together in an manner providing a secure feeling for use as tongs. Published U.S. patent application no. 2012/0011727 describes a fork and spoon combination held together at end portions by the use of magnets.

SUMMARY OF THE INVENTION

The present invention is illustrated by way of example in the attached drawings and includes two elongate serving implements, illustrated as a slotted spoon and un-slotted spoon, that may be easily connected together by respective inter-fitting portions that securely hold the utensils together while resiliently spaced, but may be separated easily.

The two elongate serving implements can be connected together to serve as tongs and each includes a first end portion serving as a food implement and complimentary structures formed at respective second end portions to be interconnected by a pivoting motion to join them together into operative positions. Each of the serving implements has adjacent the second end portions a raised cam surface. These cam surfaces can engage one another as the serving implements are pivoted to be joined together to separate the first end portions of the serving implements and hold then resiliently spaced from one another. In this way, the serving implements may be joined together to serve as salad tongs, or barbeque tongs, or other food handling implement.

The complementary structures may include an oval-shaped opening in one of the second end portions and an oval-shaped projection in the other second end portion; such oval-shaped opening and oval-shaped projection being orthogonal to one another while the serving implements are in the operative positions serving as tongs.

Preferably, one of the cam surfaces has a male projection and the other cam surface has a complimentary female recess with sloping side walls to enable the male projection to be received reliably and securely to hold the implements in operative positions.

BRIEF DESCRIPTION OF THE DRAWINGS

The attached figures illustrate a separable food utensil according to the present invention.

FIG. 1 illustrates in plan an embodiment of a slotted spoon forming part of the present invention;

FIG. 2 illustrates in plan a side view thereof;

FIG. 3 illustrates a cross section through line 3-3 of FIG. 1;

FIG. 4 illustrates in plan an embodiment of an un-slotted spoon that may be used as the second implement of the present invention;

FIG. 5 illustrates in plan a side view of the un-slotted spoon of FIGS. 4 and 5;

FIG. 6 illustrates a cross section through line 7-7 of FIG. 7;

DETAILED DESCRIPTION OF AN EMBODIMENT

Figure 7:
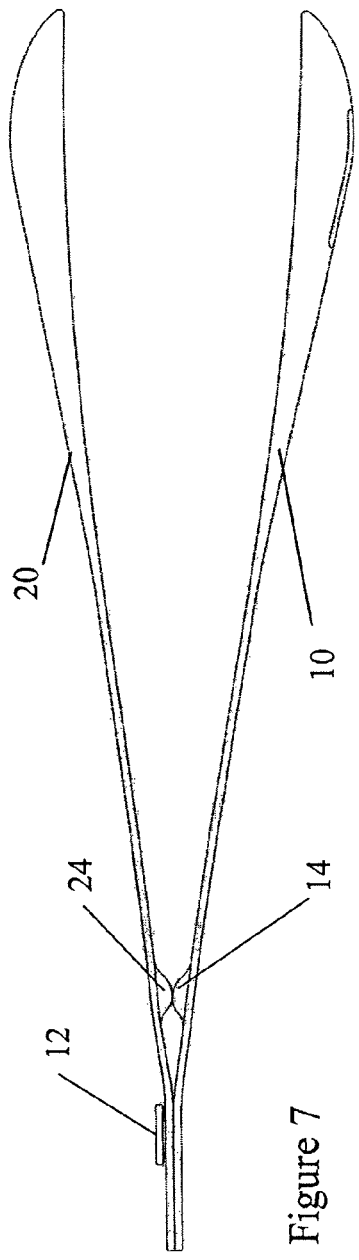
FIG. 7 illustrates the assembled condition of the present invention.

FIGS. 1, 2 and 3 illustrate a slotted spoon 10 forming a serving implement according to the present invention that includes an upstanding oval extension 12 extending upwardly from a narrowed support 18, as can be seen in FIG. 2, and a raised cam surface 14 having a recessed female slot 16. Preferably, opposing side walls of the female slot 16 taper inwardly, as will be described further below.

FIGS. 4, 5 and 6 illustrate an un-slotted spoon 20 forming a second serving implement according to the present invention. An oval opening 22 is provided therethrough, situated orthogonally to the raised oval extension 12 of the slotted spoon. A raised cam surface 24 extends to a male projection 26 adapted to fit snugly within the tapered walls of the recessed female slot 16 in slotted spoon 10.

Figure 9:
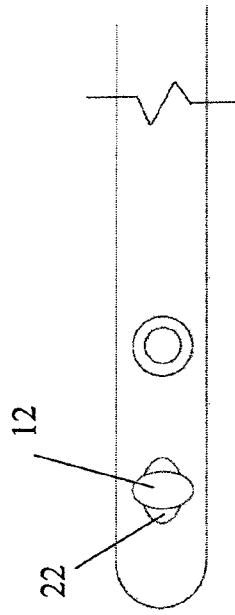
FIGS. 8 and 9 illustrate the assembly of the present invention.
Figure 8:
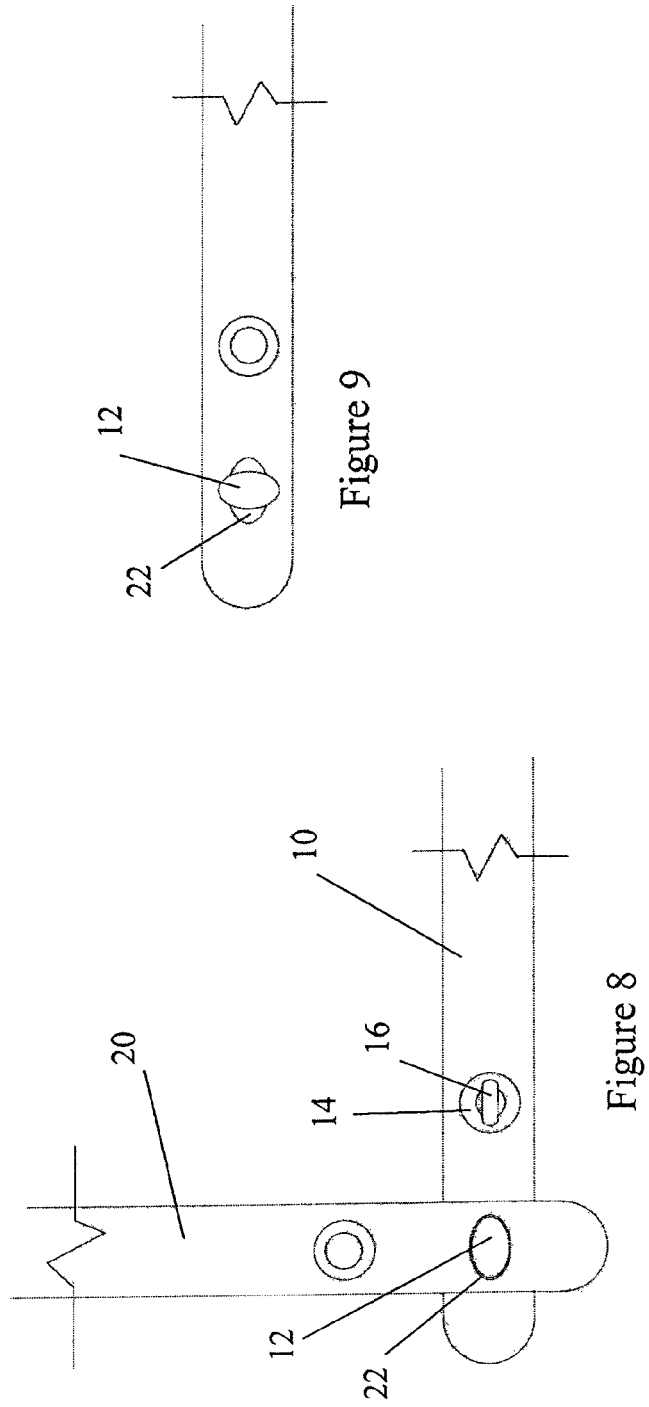

As shown in FIG. 7, the raised oval extension 12 of slotted spoon 10 can be fitted within the oval opening 22 of the un-slotted spoon 20, and pivoted into the position shown in FIGS. 8 and 9 to align the slotted spoon 10 and un-slotted spoon 20 as the respective cam surfaces engage to spread the lower portions of the slotted spoon 10 and un-slotted spoon 20 until the male projection 26 snaps into the recessed female slot 16 in slotted spoon 10.

In this way, the slotted spoon 10 and un-slotted spoon 20 can easily be interconnected securely with the free ends separated to serve as serving tongs; and yet readily separated with one hand by pushing in either lateral direction the slotted spoon 10 relative the un-slotted spoon 20. In this way, the slotted spoon 10 and un-slotted spoon 20 can be spread slightly and pivoted relative one another to enable the raised oval extension 12 to be aligned with the oval opening 22 to enable the slotted spoon 10 and un-slotted spoon 20 to be separated.

Of course, other implements can be used with the present invention, such as salad fork and spoon connect to form tongs; and the present invention is not limited to the configurations shown.

The food implements can be formed of a unitary material of food grade quality and proper resilience; such as Bakelite, and can be molded as two separate pieces with no need for additional parts for efficiency in manufacture and use.

What is claimed is:

1. Two serving implements adapted to be connected together to serve as tongs, said serving implements each being elongate with a first end portion adapted to function as a serving implement and each including complimentary structures formed at respective second end portions to be interconnected by a lateral pivoting motion to join said serving implements together into operative positions, each of said serving implements having adjacent said second end portions a raised cam surface;

said cam surfaces having substantially sloped side walls such that said cam surfaces are adapted to slidably engage one another as said serving implements are laterally pivoted to be joined together, and upon engaging, said cam surfaces separate the first end portions of said serving implements and hold then resiliently spaced from one another in an operative position; one of said cam surfaces having a male projection and the other of said cam surfaces having a complimentary female recess adapted to hold said implements in said resiliently spaced operative positions.

2. Serving implements as set forth in claim 1, said complementary structures including an oval-shaped opening in one of said second end portions and an oval-shaped projection in the other of said second end portions; said oval-shaped opening and oval-shaped projection being orthogonal to one another in said operative positions.

3. Serving implements as set forth in claim 1, said male and female recess having sloped side walls, adapted to disengage one another as said serving implements are laterally pivoted apart.

* * * * *